United States Patent
Parello et al.

(10) Patent No.: US 12,389,302 B1
(45) Date of Patent: Aug. 12, 2025

(54) MOBILE TERMINAL HANDOVER DECISION OPTIMIZATIONS

(71) Applicant: Nokia Solutions and Networks Oy, Espoo (FI)

(72) Inventors: Rosalia Parello, Versailles (FR); Denis Verdier, Versailles (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/042,260

(22) Filed: Jan. 31, 2025

(30) Foreign Application Priority Data

Feb. 1, 2024 (FI) .................................. 20245099

(51) Int. Cl.
| | | |
|---|---|---|
| *H04W 36/36* | (2009.01) | |
| *G06N 3/08* | (2023.01) | |
| *H04W 36/00* | (2009.01) | |
| *H04W 36/22* | (2009.01) | |
| *H04W 36/32* | (2009.01) | |

(52) U.S. Cl.
CPC ............ *H04W 36/362* (2023.05); *G06N 3/08* (2013.01); *H04W 36/008355* (2023.05); *H04W 36/00838* (2023.05); *H04W 36/22* (2013.01); *H04W 36/324* (2023.05)

(58) Field of Classification Search
None
See application file for complete search history.

(56) References Cited

U.S. PATENT DOCUMENTS

| | | | | |
|---|---|---|---|---|
| 2001/0046879 A1* | 11/2001 | Schramm | ............ | H04W 36/304 |
| | | | | 455/524 |
| 2023/0189022 A1* | 6/2023 | Ramachandra | ....... | H04W 24/02 |
| | | | | 370/329 |
| 2023/0413152 A1 | 12/2023 | Zhu et al. | | |

FOREIGN PATENT DOCUMENTS

| | | | |
|---|---|---|---|
| WO | WO 2023/014896 A1 | 2/2023 | |
| WO | WO 2023/198265 A1 | 10/2023 | |
| WO | WO-2024175955 A1 * | 8/2024 | ........... H04B 7/0452 |

OTHER PUBLICATIONS

Nokia et al., "Input to DraftCR 28.105 Configuration of Mobility Optimization Functions," 3GPP TSG-SA5 Meeting #152, S5-237486, Nov. 13-17, 2023, Chicago, IL.

(Continued)

*Primary Examiner* — Charles N Appiah
*Assistant Examiner* — Frank E Donado
(74) *Attorney, Agent, or Firm* — McCarter & English LLP

(57) ABSTRACT

There are provided measures for mobile terminal handover decision optimizations. Such measures exemplarily include, e.g. at a network entity of a first network cell providing network access to a terminal, obtaining information indicative of a terminal mobility profile of said terminal, predicting, utilizing a trained neural network, for each cell configuration of a plurality of cell configurations related to mobility and throughput balance, a throughput optimization degree for said terminal mobility profile, selecting, from said plurality of cell configurations, a cell configuration having a highest throughput optimization degree, and deciding, based on said highest throughput optimization degree whether to trigger a handover of said terminal from said first network cell to a second network cell.

20 Claims, 17 Drawing Sheets

(56) References Cited

OTHER PUBLICATIONS

3GPP TR 37.817 V17.0.0, "3rd Generation Partnership Project; Technical Specification Group Radio Access Network; Evolved Universal Terrestrial Radio Access (E-UTRA) and NR; Study on enhancement for Data Collection for NR and EN-DC (Release 17)," Apr. 6, 2022.

Prado, A. et al., "Enabling Proportionally—Fair Mobility Management With Reinforcement Learning in 5G Networks," IEEE Journcal on Selected Areas in Communications, vol. 41, No. 6, Jun. 2023.

* cited by examiner

MOBILE TERMINAL HANDOVER DECISION OPTIMIZATIONS

FIELD

Various example embodiments relate to mobile terminal handover decision optimizations. More specifically, various example embodiments exemplarily relate to measures (including methods, apparatuses and computer program products) for realizing mobile terminal handover decision optimizations.

BACKGROUND

The present specification generally relates to consideration of terminal mobility and cell configuration for handover decisions facilitating cell performance.

Wireless communications systems design and deployment aim to provide multiple telecommunications services and may include a number of base stations (BS) providing cell coverage to support communications for a number of user equipments (UE).

A UE or mobile terminal may communicate with a BS or network element via the downlink (DL) and uplink (UL). The DL refers to the communications link from the BS to the UE, and the UL refers to the communications link from the UE to the BS.

Multiple-access technologies could include different multiplexed resources variants, such as code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

At physical layer on radio access network air interface, in multi resources approach for multiple access, optimized users handling is based on the orthogonality properties of signal propagation statistics: it allows to discriminate each among all served users, to achieve the performance quality target and adequate acceptable user perception.

For an OFDMA system, the multiple access is achieved by assigning subsets of frequencies (sub-carriers) to individual users based on orthogonality properties of frequency-division multiplexing digital modulation scheme.

At physical layer, the orthogonality among sub-carriers frequencies relies on the condition that transmitter and receiver peer entities operate with exactly the same reference frequency position of the reference signal resources.

FIG. 4 is a schematic diagram illustrating an exemplary sub-carrier arrangement of radio resources, and in particular illustrates perfect sub-carriers orthogonality.

When the transmitter and receiver peer entities do not operate with the same frequency reference, the perfect orthogonality property of the sub-carriers is lost.

This leads to subcarrier leakage that causes inter-carrier-interference (ICI).

FIG. 5 is a schematic diagram illustrating an exemplary sub-carrier arrangement of radio resources, and in particular illustrates sub-carriers orthogonality loss at a receiver not operating with same frequency reference as a transmitter.

If not measured and not correctly compensated in the receiver, this induces errors in the decoding of the modulated data carried by physical resources, de-mapped in receiver from sub-carriers' position not aligned with transmitter reference frequencies.

On the receiver side, due to the importance of using low-cost components in the mobile handset (e.g. UE), local oscillator frequency drifts are usually greater than in the radio base station and are typically a function of parameters such as temperature changes and voltage variation.

This difference between the reference frequencies is widely referred to as carrier frequency offset (CFO).

Even in an ideal case where the local oscillators are perfectly aligned, a frequency offset between transmitter and receiver due to the Doppler effect (i.e. the apparent change in frequency of a wave in relation to an observer moving relative to the wave source) also generates a frequency error, as the transmitter or the receiver is moving.

At the receiver side, a partial or incorrect frequency offset estimation or compensation could result in a higher bit error rate (BER) with user perception degradation and performance loss.

A correct compensation of a frequency error relies on the precise error estimation and has major impact in signal processing for successful data decoding result. The higher the speed, the larger the frequency offset, and the more precise the estimation of the error to be compensated has to be.

At the receiver side, the carrier frequency offset $\Delta f_{offset}$ effect could be represented in time domain by a multiplication of the received signal, i.e. x(t), with a rotating vector as given in the Expression (1):

$$x(t) \cdot e^{j2\pi t \cdot \Delta f_{offset}} \quad (1)$$

In the receiver device, the $\Delta f_{offset}$ can be represented as given in the Expression (2):

$$\Delta f_{offset} = (N+\varepsilon)\Delta f_s \quad (2)$$

where $\Delta f_s$ is the frequency bandwidth assigned to each physical resource carrying modulated signal, i.e. the sub-carrier spacing; N is an integer part, and error $\varepsilon$ is a fractional part in [−0.5; 0.5] range.

If N is different from Zero, then the received modulated data are found in the wrong positions with respect to the expected reference frequency positions. This simply results in a BER, if the frequency offset is not compensated at the receiver independently of the value of the error $\varepsilon$.

In the case of N=0 and the error s is not Zero, the perfect subcarrier orthogonality is lost (as illustrated in FIG. 5), resulting in ICI inducing a decoding error with impact on user perception.

Even in an ideal case where the local oscillators of transmitter and receiver peer entities are perfectly aligned, the relative speed between transmitter and receiver is the main source of a frequency error due to the Doppler effect on the user communication channel.

Due to UE mobility, the Doppler offset could be characterized in the receiver as CFO estimated over a pre-defined set of frequency and time physical signal resources, used by transmitter and receiver peer entities as reference resources.

Those are pilot tones on which a reference signal is mapped which used in the receiver for signal and noise processing that is preliminary input to the modulated data processing and decoding operations.

FIG. 6 is a schematic diagram illustrating an exemplary sub-carrier arrangement of radio resources and exemplary pilot tone positions, and in particular illustrates an example of a time/frequency domains grid for physical (reference) resources and modulated data mapping in transmitter and receiver peer entities.

The radio base station, in the receiver processing, could estimate the frequency offset (FO) as the variation of the channel in the frequency domain, that the receiver needs to precisely estimate and correctly compensate before decoding data operation.

In the receiver, the FO estimation could be based on channel estimates over the pilot tones reserved to reference signal processing.

FIG. 7 is a schematic diagram illustrating an exemplary signal processing, and in particular illustrates an example of a corresponding radio base station receiver signal processing scheme.

The receiver could compute the channel estimate over the reference pilot tones in earlier time position as $H_{position\ 1}^{PILOT}$.

If transmitter and receiver peer entities reserved to reference pilot tones have close positions in time, and under the assumption that the communication channel slowly variates, the channel estimate on pilot tones in later time position $H_{position\ 2}^{PILOT}$ could be assumed approximately close to earlier $H_{position\ 1}^{PILOT}$ channel estimate on pilot tones in earlier time position.

As in time domain, a frequency offset $\Delta f_{offset}$ could be represented as given in the Expression (1) by a multiplication of the signal x(t) with a rotating vector:

$$x(t) \cdot e^{j2\pi t \cdot \Delta f_{offset}} \quad (1)$$

Under the assumption that the communication channel varies slowly among pilot tones reference time, the expected channel estimates over the pilot tones in later time position $H_{position\ 2}^{PILOT}$ could be defined as given in Expression (3):

$$H_{position\ 2}^{PILOT} \approx e^{j2\pi t \cdot \Delta f_{offset}} \cdot H_{position\ 1}^{PILOT} \quad (3)$$

Having acquired the channel estimates over the pilot tones, the frequency offset estimation $\Delta f_{offset}$ could be computed from the cross-correlation of the channel estimates over the reference pilot tones as in Expression (4):

$$\frac{H_{position\ 2}^{PILOT} \cdot (H_{position\ 1}^{PILOT})^*}{\|H_{position\ 1}^{PILOT}\|^2} \approx e^{j2\pi t \cdot \Delta f_{offset}} \quad (4)$$

FIG. 8 is a schematic diagram illustrating channel estimations and exemplary pilot tone positions, and in particular illustrates an example for such a frequency offset estimation based on channel estimates.

The smaller the number of physical resources reserved to pilot tones inputs to the cross-correlation of the channel estimates is, the less accurate is the FO estimation, i.e., leading to a potentially higher error in case of higher speed mobility.

On the other hand, the higher the number of physical resources reserved to pilot tones inputs to the cross-correlation of the channel estimates is, the smaller the resources amount allocated (allocatable) to the modulated data is, i.e., leading to a potentially reduced achievable user data rate.

In the radio access node, the cell could be configured with less physical reference resources reserved to pilot tones for channel estimate cross-correlation, i.e. with a low-speed cell profile. A low-speed cell profile is exemplarily illustrated in FIG. 6 and in FIG. 9. FIG. 9 is a schematic diagram illustrating low-speed cell profile characteristics, and in particular illustrates an example of a time/frequency grid of resources mapping in a low-speed cell profile.

On the other hand, in the radio access node, the cell could be configured with rather more physical reference resources reserved to pilot tones for channel estimate cross-correlation, i.e. with a high-speed cell profile for improved cell performance by higher speed estimation accuracy. A high-speed cell profile is exemplarily illustrated in FIG. 10. FIG. 10 is a schematic diagram illustrating high-speed cell profile characteristics, and in particular illustrates an example of a time/frequency grid of resources mapping in a high-speed cell profile.

Once the cell is configured, the radio access network needs to provide the served users with the related settings signaling.

In a radio base station receiver, the optimal approach for providing multiple access relies on the efficient cell configuration for the best compromise between higher amount of reference frequencies resources reserved for higher offset estimate precision, as needed for high-speed users, and higher number of resources dedicated to data for better throughput of UEs in stationary or low-speed radio conditions.

Hence, the problem arises that a trade-off between an offset estimate precision suitable for high-speed terminals/mobile equipments/UEs and throughput depends on a distribution of to be served UEs in terms of their type, i.e., high-speed or stationary/low-speed is to be flexibly found, and terminals/mobile equipments/UEs are preferably to be allocated to suitable cells to achieve optimal cell performances.

Hence, there is a need to provide for mobile terminal handover decision optimizations.

SUMMARY

Various example embodiments aim at addressing at least part of the above issues and/or problems and drawbacks.

Various aspects of example embodiments are set out in the appended claims.

According to an exemplary aspect, there is provided a method of a network entity of a first network cell providing network access to a terminal, the method comprising obtaining information indicative of a terminal mobility profile of said terminal, predicting, utilizing a trained neural network, for each cell configuration of a plurality of cell configurations related to mobility and throughput balance, a throughput optimization degree for said terminal mobility profile, selecting, from said plurality of cell configurations, a cell configuration having a highest throughput optimization degree, and deciding, based on said highest throughput optimization degree whether to trigger a handover of said terminal from said first network cell to a second network cell.

According to an exemplary aspect, there is provided an apparatus of a network entity of a first network cell providing network access to a terminal, the apparatus comprising at least one processor, and at least one memory storing instructions that, when executed by the at least one processor, cause the apparatus at least to perform obtaining information indicative of a terminal mobility profile of said terminal, predicting, utilizing a trained neural network, for each cell configuration of a plurality of cell configurations related to mobility and throughput balance, a throughput optimization degree for said terminal mobility profile, selecting, from said plurality of cell configurations, a cell configuration having a highest throughput optimization degree, and deciding, based on said highest throughput optimization degree whether to trigger a handover of said terminal from said first network cell to a second network cell.

According to an exemplary aspect, there is provided an apparatus of a network entity of a first network cell providing network access to a terminal, the apparatus comprising obtaining circuitry configured to obtain information indicative of a terminal mobility profile of said terminal, predicting circuitry configured to predict, utilizing a trained neural network, for each cell configuration of a plurality of cell configurations related to mobility and throughput balance, a throughput optimization degree for said terminal mobility profile, selecting circuitry configured to select, from said plurality of cell configurations, a cell configuration having a highest throughput optimization degree, and deciding circuitry configured to decide, based on said highest throughput optimization degree whether to trigger a handover of said terminal from said first network cell to a second network cell.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination of UE-cell allocations optimal in terms of cell performance to thereby solve at least part of the problems and drawbacks identified in relation to the prior art.

By way of example embodiments, there is provided mobile terminal handover decision optimizations. More specifically, by way of example embodiments, there are provided measures and mechanisms for realizing mobile terminal handover decision optimizations.

Thus, improvement is achieved by methods, apparatuses and computer program products enabling/realizing mobile terminal handover decision optimizations.

BRIEF DESCRIPTION OF THE DRAWINGS

In the following, the present disclosure will be described in greater detail by way of non-limiting examples with reference to the accompanying drawings, in which.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

According to example embodiments, in general terms, there are provided measures and mechanisms for (enabling/realizing) mobile terminal handover decision optimizations.

In wireless access networks, a traditional approach for handover procedure consists in reporting measurements from UEs based on a perceived DL signal strength.

While this approach may lead to an optimized performance for an individual UE, this does not mean that thus a performance optimization over a couple of cells can be achieved.

Such performance optimization over a couple of cells can be achieved in case suitability of a cell for a UE (in particular in terms of mobility of the UE) is considered for each UE to facilitate UE homogeneity on respective cells.

Figure 13:
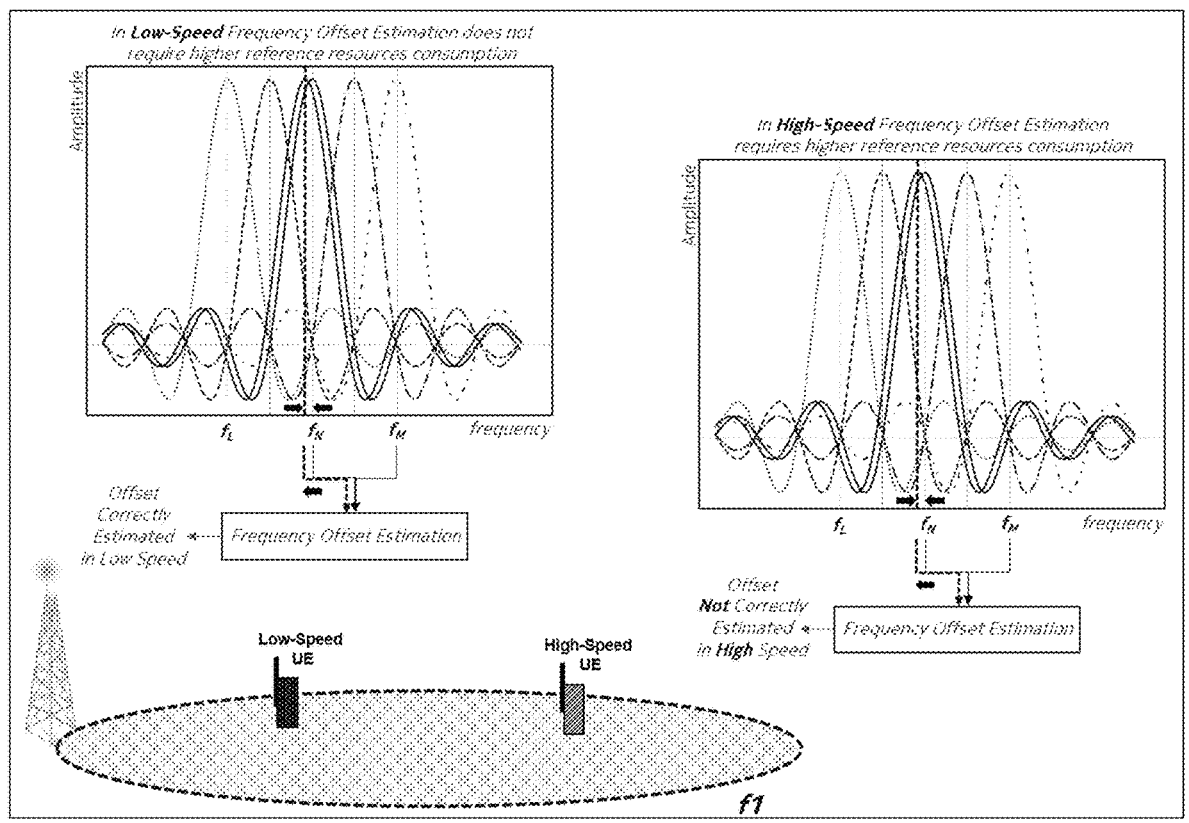
FIG. 13 is a schematic diagram illustrating low-speed cell profile characteristics and high-speed cell profile characteristics.
Figure 14:
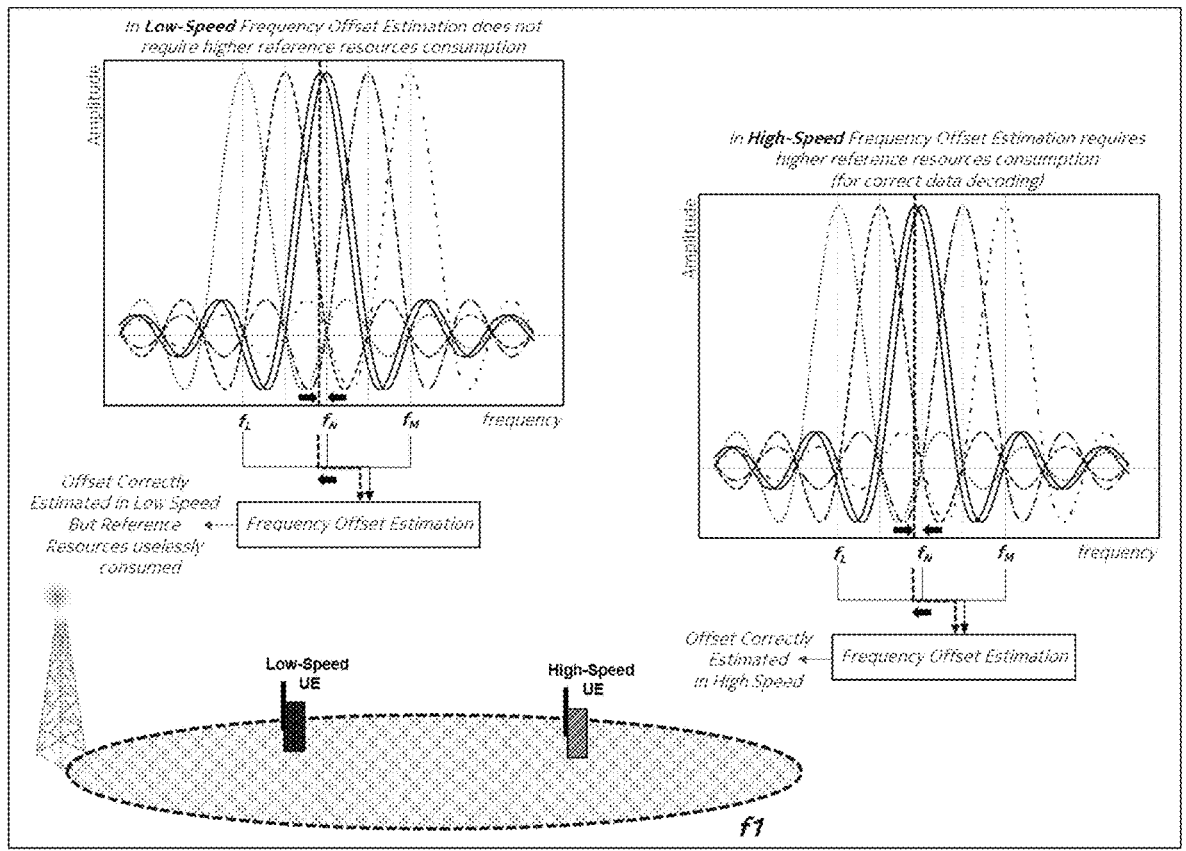
FIG. 14 is a schematic diagram illustrating low-speed cell profile characteristics and high-speed cell profile characteristics.

Namely, in a radio base station receiver, the optimal approach for providing multiple access relies on the efficient cell configuration for the best compromise between a higher number of resources grantable to data for better throughput of UEs in stationary or low speed radio conditions (see example of low-speed UE on the left in FIG. 13), and a higher reference resources amount reserved to frequency offset error estimate for high-speed users (see example of high-speed UE on the right in FIG. 14).

FIG. 13 is a schematic diagram illustrating low-speed cell profile characteristics and high-speed cell profile characteristics, and in particular illustrates an example of a reduced reference resources number to frequency offset estimate.

FIG. 14 is a schematic diagram illustrating low-speed cell profile characteristics and high-speed cell profile characteristics, and in particular illustrates an example of a higher reference resources number to frequency offset estimate.

In this regard, it is noted that the more heterogeneous a composition of to be served UEs is, for the more UEs the found cell's compromise between high-speed suitability and throughput is sub-optimal. On the other hand, the more homogeneous a composition of to be served UEs is, for the more UEs the found cell's compromise between high-speed suitability and throughput is close to optimal.

Also in view thereof, generally, a static cell configuration represents a sub-optimal solution for a mixed speed profile of served users/UEs (see example in FIG. 13 of a low-speed UE and a high-speed UE in the same low-speed cell configuration). For a cell configuration aiming to maximize the throughput with less resources reserved to frequency offset estimate, performance degradation could be observed for high-speed users (see example of high-speed UE in FIG. 13). For a cell configuration aiming to maximize the throughput of high-speed users, with more reference resources reserved to frequency offset error estimate, higher data resource consumption translates into poor performance for low-speed UE (see example of low-speed UE in FIG. 14).

Hence, in brief, according to example embodiments, a dynamic approach based on radio base station receiver UL speed profile estimate is provided.

Namely, according to example embodiments, it is determined whether a handover is to be started by radio base station based on UL estimation of UE speed profile.

Heretofore, according to example embodiments, in wireless communication access networks, neural network-based UL user speed profile learning and prediction for handover decision is provided.

In particular, according to example embodiments, dynamically optimized frequency layouts to handle mixed users speed profile in a radio access network are selected. According thereto, based on the actual speed estimation it is determined whether a handover decision is to be performed towards an optimum frequency layout.

According to example embodiments, this includes a learning and predicting neural network with the UL speed profile estimate as an input and probabilities for cell speed profile optimality as an output.

The predicted output and the target output delta represents the error to minimize for the selected speed profile.

According to example embodiments, it is aimed to maximizing access network performance with optimal speed resources allocation improving the cell throughput performance in the access network.

Figure 15:
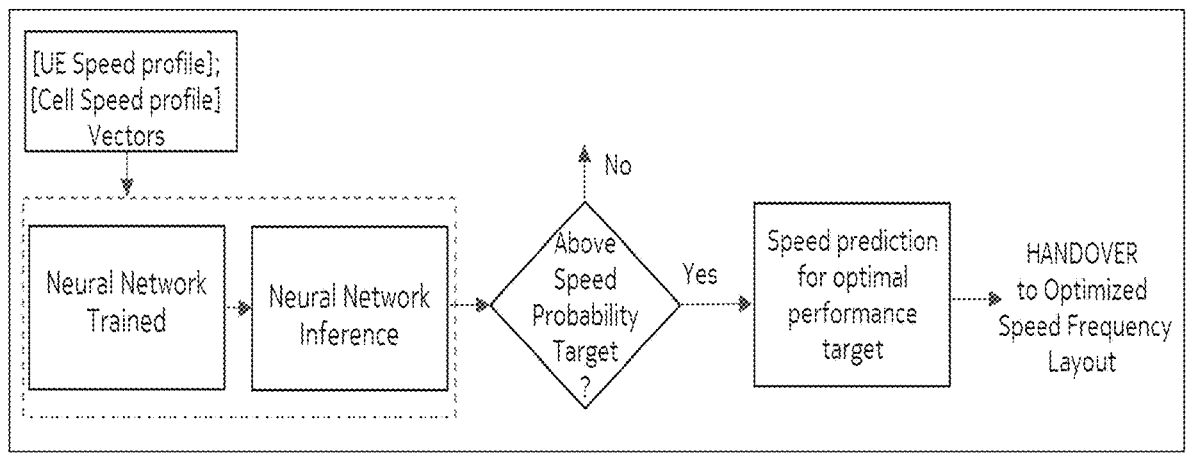
FIG. 15 is a schematic diagram illustrating an exemplary signal processing.

FIG. 15 is a schematic diagram illustrating an exemplary signal processing, and in particular illustrates an example of an approach for finding the optimal handover decision.

In particular, FIG. 15 shows a method according to example embodiments based on a neural network starting with UE speed and cell speed profile vectors as inputs and outputting a UE speed profile probability.

Based on this probability, a handover decision is evaluated.

If confirmed, according to example embodiments, the radio base station initiates signaling to UE.

Consequently, according to example embodiments, the service is redirected to an optimized speed frequency network layout, defined as a planned, coordinated cellular cluster with same configured cell settings: same reference resources (pilot tones) number allocated to frequency error estimation (for high-speed or low-speed users) with respect to a same spectrum central frequency (e.g. Fc).

Figure 16:
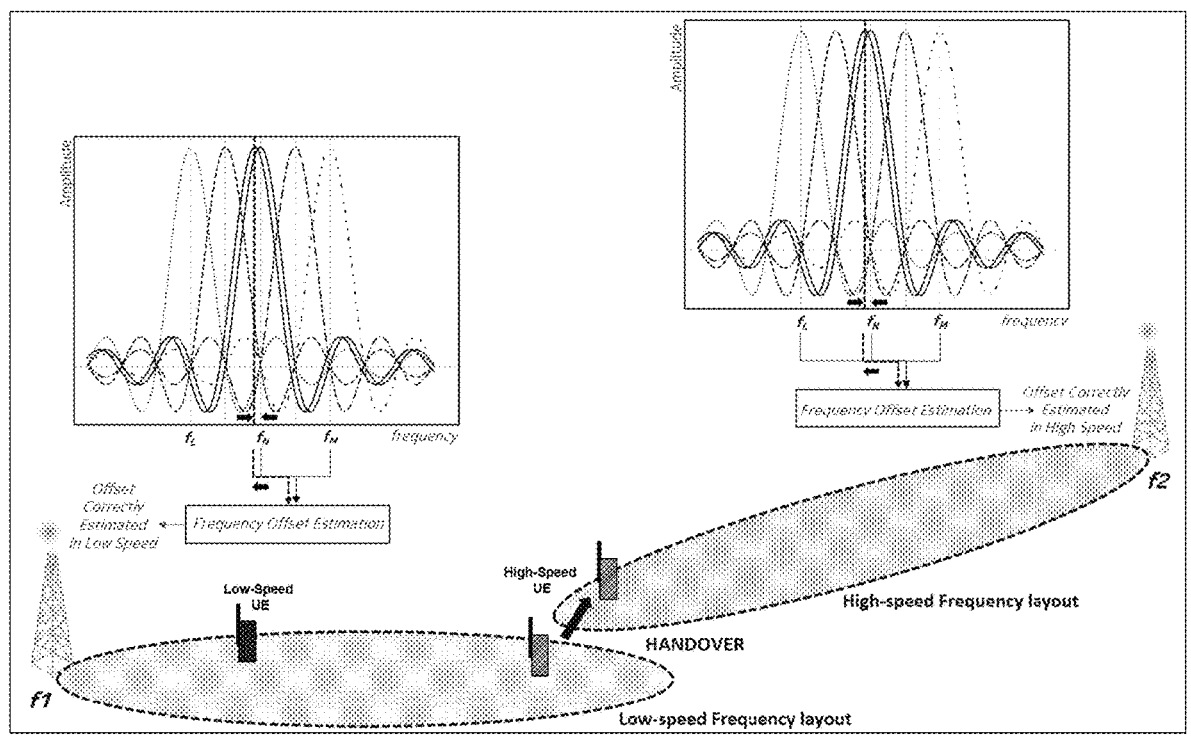
FIG. 16 is a schematic diagram illustrating low-speed cell profile characteristics, high-speed cell profile characteristics, and a handover decision.

FIG. 16 is a schematic diagram illustrating low-speed cell profile characteristics, high-speed cell profile characteristics, and a handover decision, and in particular illustrates a handover resulting from a respective decision utilizing principles of example embodiments.

As utilized according to example embodiments, wireless access network (AN) design can benefit from intelligent resources allocation by integrating fast learning and efficient artificial neural networks resource optimized prediction of a UE speed profile.

A neural network is an artificial neural network comprising a given number of hidden layers between the input layer and the output layer. Artificial neural networks may include interconnected groups of artificial neurons. Training of the neural network allows it to find the correct mathematical manipulation to transform the input into the proper output even when the relationship is highly nonlinear and/or complicated.

The artificial neural network may be a computational device or represented as a method to be performed by a computational device. A set of rules that are designed to execute tasks such as regression, classification, clustering, and pattern recognition are comprised in the artificial neural network.

Such objectives are achieved by the artificial neural network through a training (learning) procedure by processing examples, each of which contains a known input and result, forming probability-weighted associations between the two, which are stored within the data structure of the net itself. The training of a neural network from a given example is conducted by determining the error between the processed output of the network (prediction) and a target output. The network then adjusts its weighted associations according to a learning rule and using this error value. Successive adjustments allow the neural network to produce output that is increasingly similar to the target output. After a sufficient number of these adjustments, the training can be terminated based on certain criteria. Learning by using labels is called supervised learning, and learning without labels is called unsupervised learning. Deep learning typically requires a large amount of input data.

Applying neural network-based UL speed profile learning to wireless communications in radio access networks allows to dynamically characterize the speed profile of the cell and to perform the right action.

Figure 11:
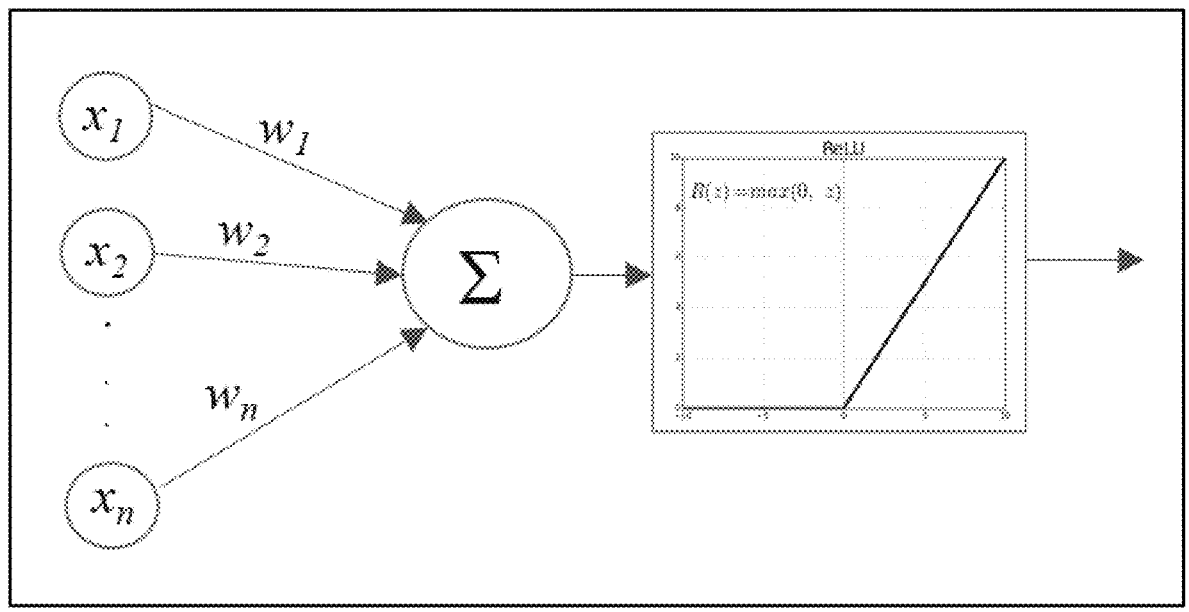
FIG. 11 is a schematic diagram illustrating neural network layer functions.
Figure 12:
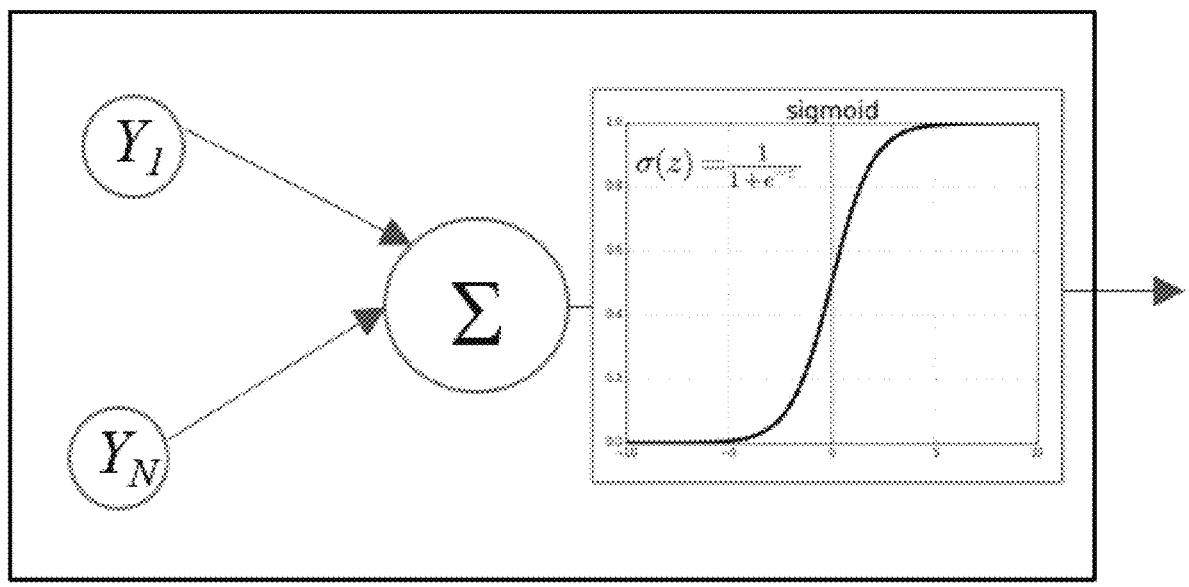
FIG. 12 is a schematic diagram illustrating neural network layer functions.

FIG. 11 and FIG. 12 are schematic diagrams illustrating neural network layer functions.

As shown in FIG. 11 and FIG. 12, in a neural network each network neuron (except those in the input layer) is actually a sum of all its inputs, which are in fact the outputs from the previous layer multiplied by some weights. An additional term called bias is added to this sum. A nonlinear function known as activation function is applied to the result.

Initial weights can be set based on different approaches. During the training phase, weights are adapted to improve the accuracy of the process based on analyzing errors in decision-making. In principle, each node of the neural network makes a decision from the input multiplied by a weight, and then compares this decision to collected data to find out the difference to the collected data. That means it determines the error, based on which the weights are adjusted.

The training phase may be performed by using a stochastic gradient descent optimization algorithm for which the gradients are calculated using a backpropagation algorithm. The gradient descent algorithm looks for changing the weights so that the next evaluation decreases the error. The optimization algorithm is navigating down the gradient, the slope, of error.

Any other suitable optimization algorithm, e.g. momentum, could be used for more efficient and accurate weights.

The function used to define the set of weights is referred to as the objective function.

As the neural networks target is to minimize the error, the objective function is referred to as a cost function or a loss function. The higher the loss, the poorer the performance of the neural network, that is why minimizing the loss allows the neural network performing better. The process of minimizing loss is called optimization. In adjusting weights, any suitable method may be used as a loss function, some examples are mean squared error (MSE), maximum likelihood (MLE), and cross entropy.

The activation function of the node defines the output of that node given an input or set of inputs. The node calculates a weighted sum of inputs, perhaps adds a bias, and then makes a decision as "activate" or "not activate" based on a decision threshold as a binary activation or using an activation function that gives a nonlinear decision function. Any suitable activation function may be used, for example sigmoid (see FIG. 12), rectified linear unit (ReLU, see FIG. 11), normalized exponential function (soft-max), softplus, tanh, etc. In deep learning, the activation function is usually set at the layer level and applies to all neurons in that layer.

The output is then used as input for the next node and so on until a desired solution to the original problem is found.

Example embodiments are specified below in more detail.

Figure 1:
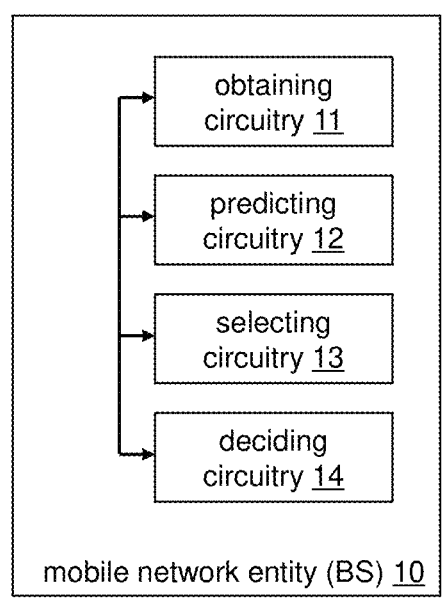
FIG. 1 is a block diagram illustrating an apparatus according to example embodiments.
Figure 3:
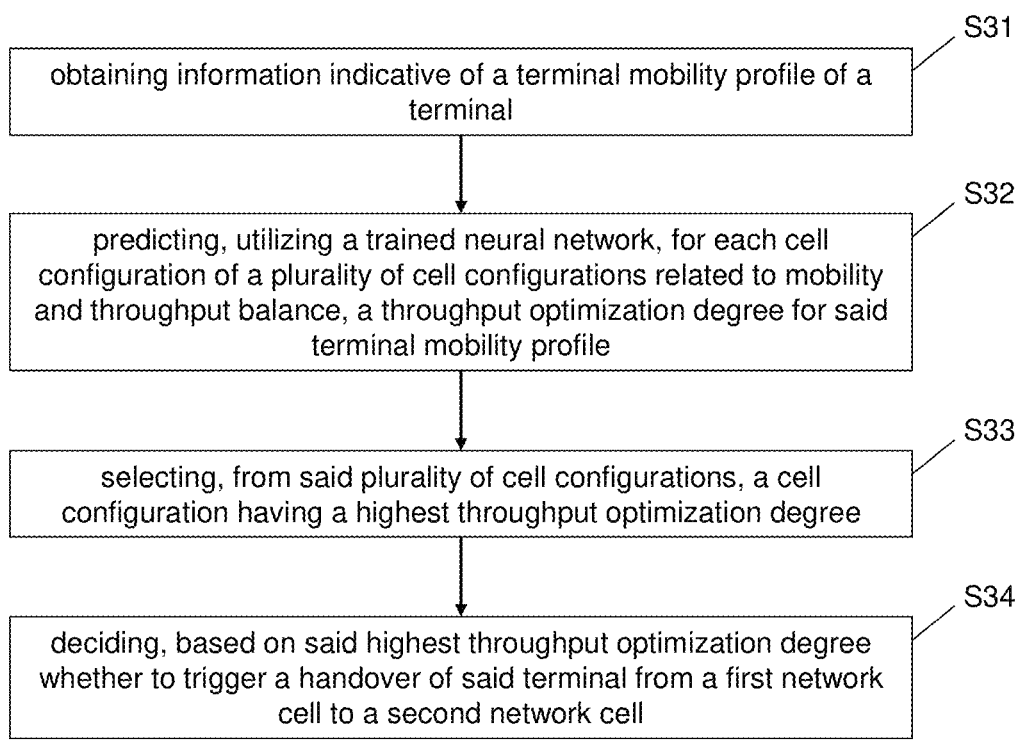
FIG. 3 is a schematic diagram of a procedure according to example embodiments.
Figure 4:
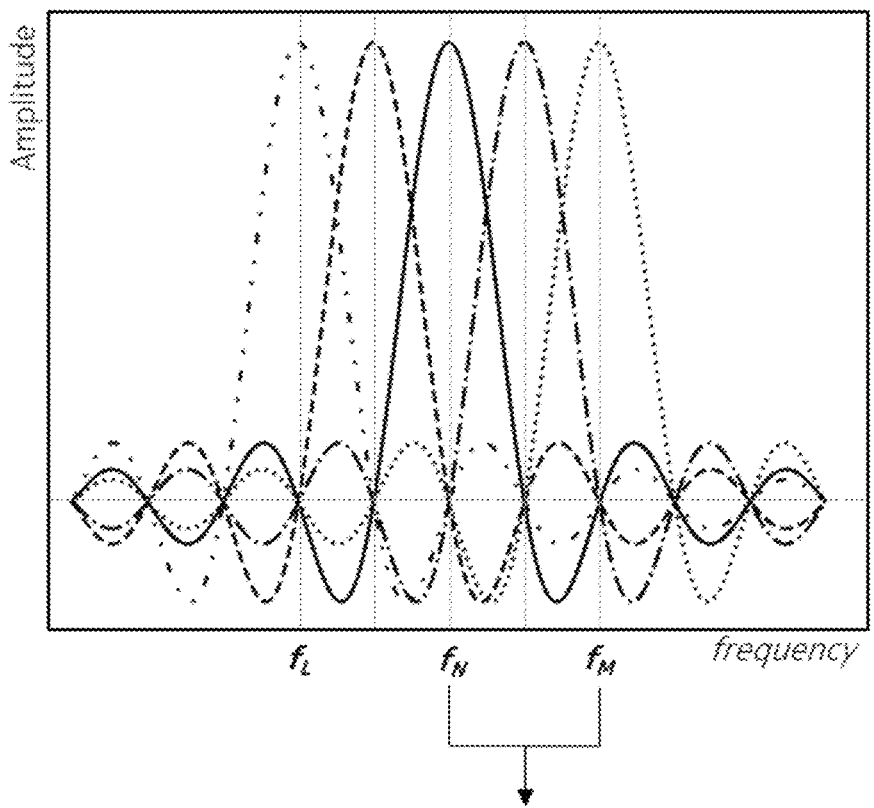
FIG. 4 is a schematic diagram illustrating an exemplary sub-carrier arrangement of radio resources.
Figure 5:
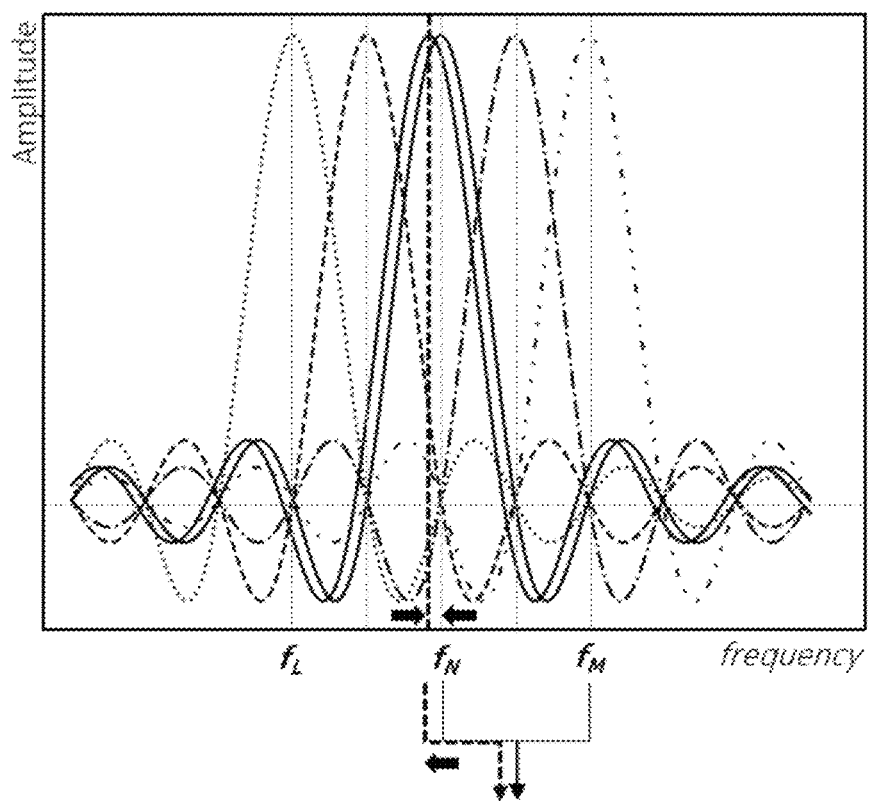
FIG. 5 is a schematic diagram illustrating an exemplary sub-carrier arrangement of radio resources.
Figure 6:
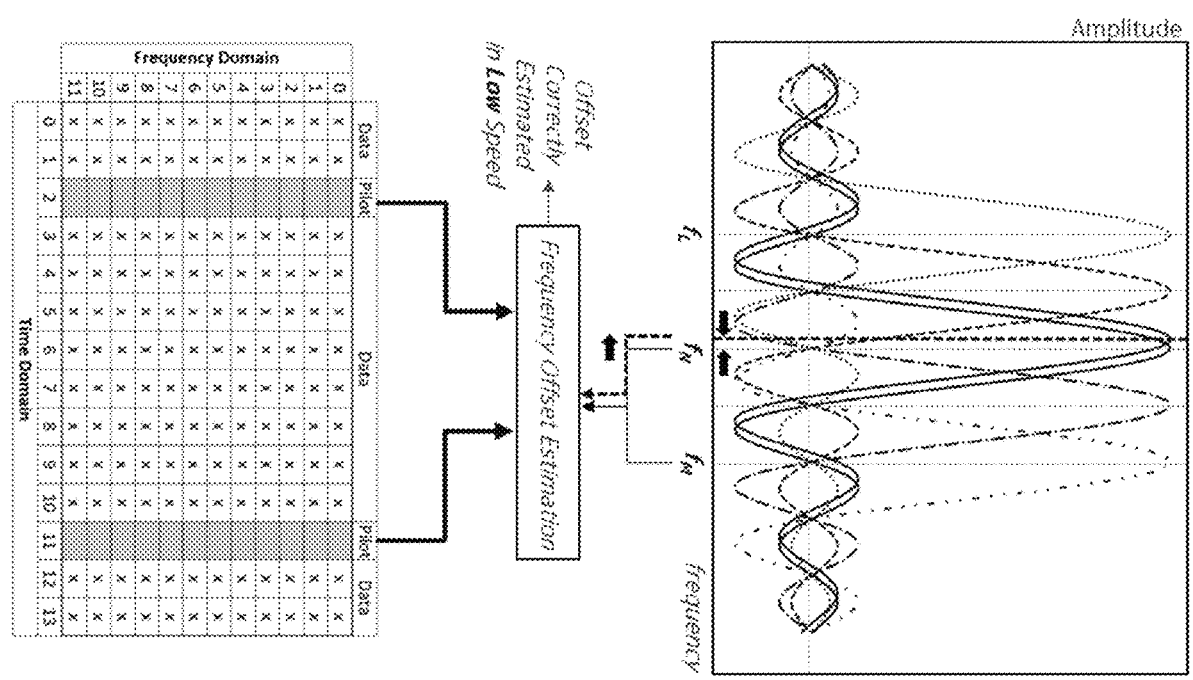
FIG. 6 is a schematic diagram illustrating an exemplary sub-carrier arrangement of radio resources and exemplary pilot tone positions.
Figure 7:
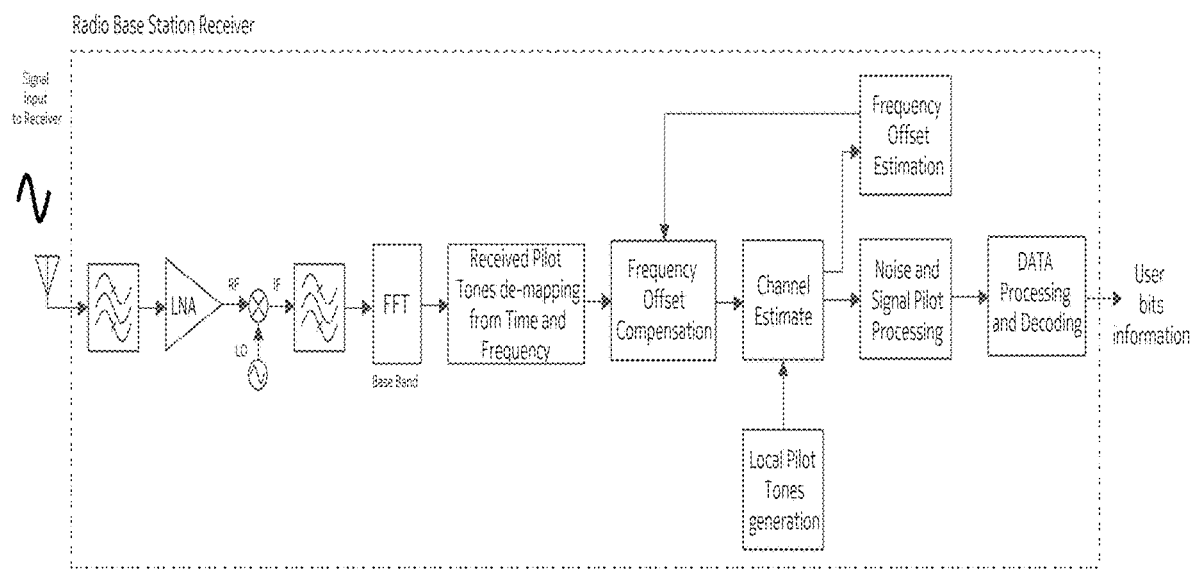
FIG. 7 is a schematic diagram illustrating an exemplary signal processing.
Figure 8:
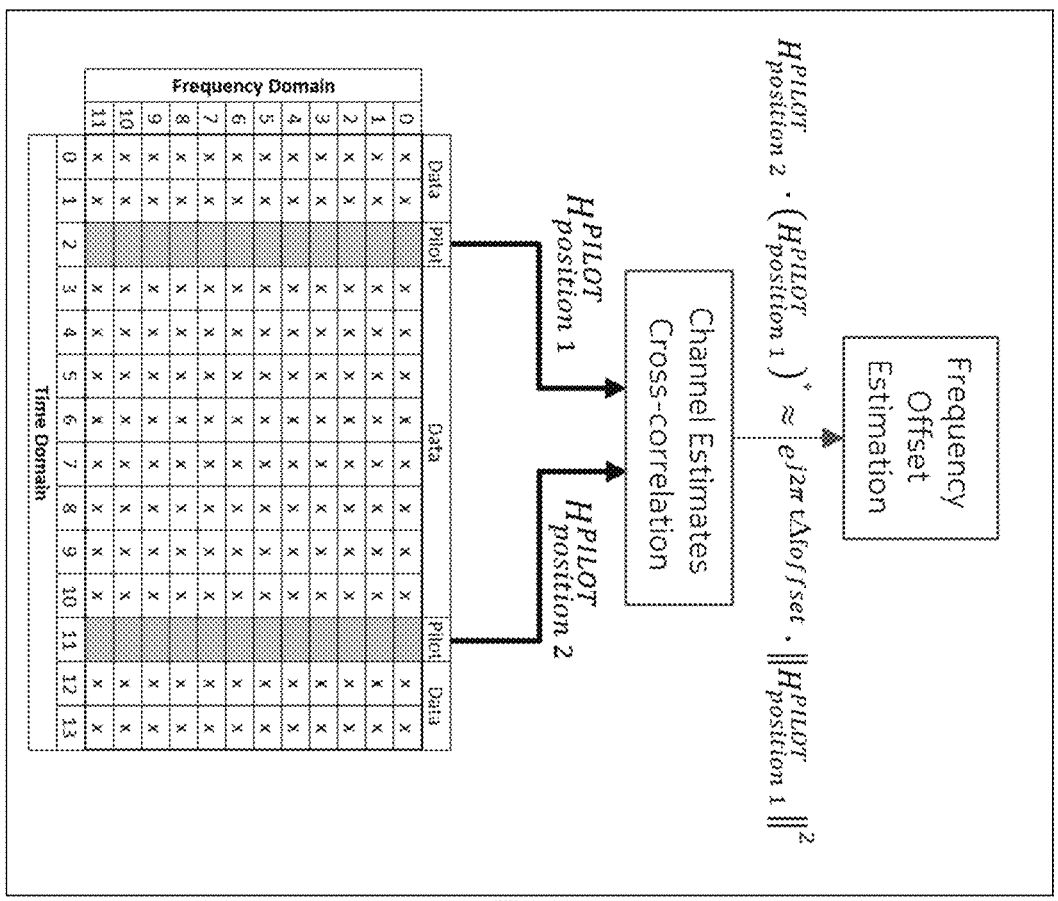
FIG. 8 is a schematic diagram illustrating channel estimations and exemplary pilot tone positions.
Figure 9:
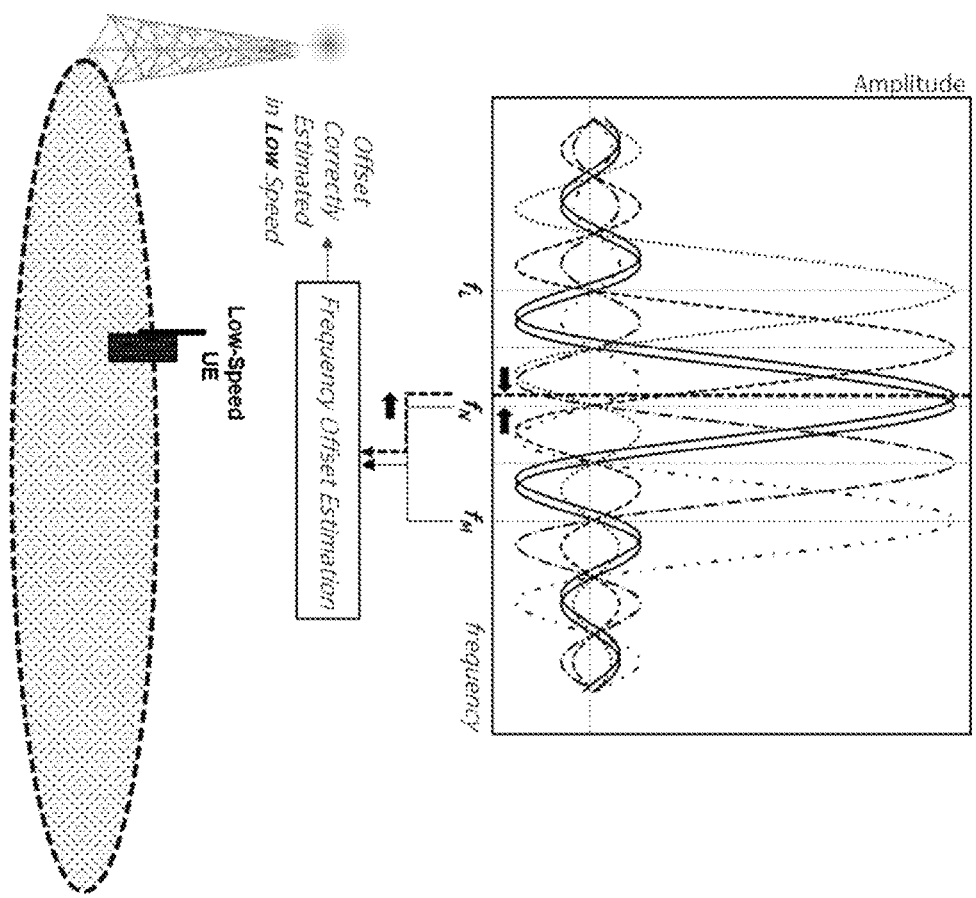
FIG. 9 is a schematic diagram illustrating low-speed cell profile characteristics.
Figure 10:
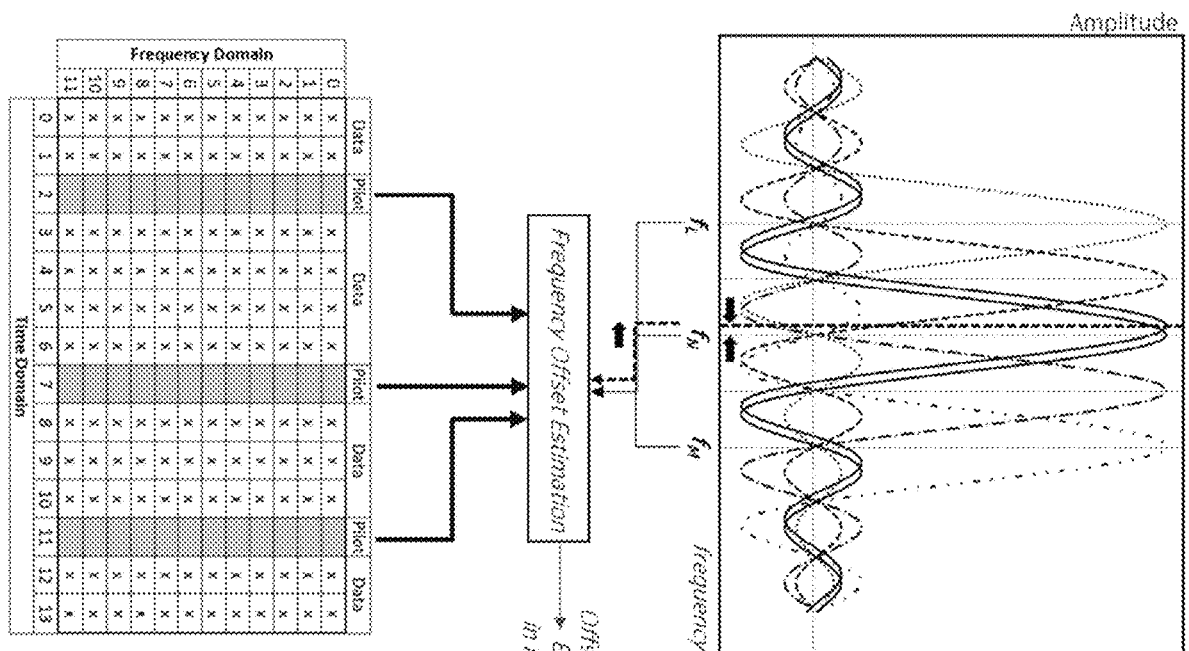
FIG. 10 is a schematic diagram illustrating high-speed cell profile characteristics.

FIG. 1 is a block diagram illustrating an apparatus according to example embodiments. The apparatus may be a mobile network node or entity, e.g. an access node or entity 10 (of a first network cell providing network access to a terminal) such as a base station comprising an obtaining circuitry 11, a predicting circuitry 12, a selecting circuitry 13, and a deciding circuitry 14. The obtaining circuitry 11 obtains information indicative of a terminal mobility profile of said terminal. The predicting circuitry 12 predicts, utilizing a trained neural network, for each cell configuration of a plurality of cell configurations related to mobility and throughput balance, a throughput optimization degree for said terminal mobility profile. The selecting circuitry 13 selects, from said plurality of cell configurations, a cell configuration having a highest throughput optimization degree. The deciding circuitry 14 decides, based on said highest throughput optimization degree whether to trigger a handover of said terminal from said first network cell to a second network cell. FIG. 3 is a schematic diagram of a procedure according to example embodiments. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to example embodiments comprises an operation of obtaining (S31) information indicative of a terminal mobility profile of said terminal, an operation of predicting (S32), utilizing a trained neural network, for each cell configuration of a plurality of cell configurations related to mobility and throughput balance, a throughput optimization degree for said terminal mobility profile, an operation of selecting (S33), from said plurality of cell configurations, a cell configuration having a highest throughput optimization degree, and an operation of deciding (S34), based on said highest throughput optimization degree whether to trigger a handover of said terminal from said first network cell to a second network cell.

Figure 2:
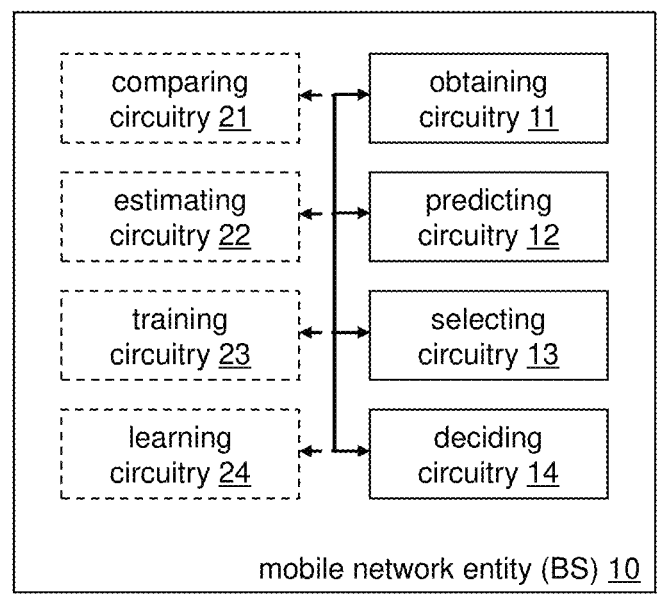
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a comparing circuitry 21, an estimating circuitry 22, a training circuitry 23, and/or a learning circuitry 24.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 3, exemplary details of the deciding operation (S34) are given, which are inherently independent from each other as such. Such exemplary deciding operation (S34) according to example embodiments may comprise an operation of comparing said highest throughput optimization degree with a trigger decision threshold, and an operation of deciding to trigger said handover of said terminal from said first network cell to said second network cell, if said highest throughput optimization degree exceeds said trigger decision threshold.

According to a variation of the procedure shown in FIG. 3, exemplary additional operations are given, which are inherently independent from each other as such. According to such variation, an exemplary method according to example embodiments may comprise an operation of estimating said terminal mobility profile of said terminal based on said information indicative of said terminal mobility profile of said terminal.

According to further example embodiments, said second cell has a cell configuration corresponding to said cell configuration having said highest throughput optimization degree.

According to a variation of the procedure shown in FIG. 3, exemplary additional operations are given, which are inherently independent from each other as such. According to such variation, an exemplary method according to example embodiments may comprise an operation of selecting said second cell out of a plurality of candidate cells based on said cell configuration having said highest throughput optimization degree and respective cell configurations of said plurality of candidate cells.

According to further example embodiments, each of said plurality of cell configurations includes at least one of a spectrum central frequency, or a number of reserved reference signal cell resources for channel estimation.

According to further example embodiments, said information indicative of said terminal mobility profile of said terminal includes at least one of an uplink frequency offset of said terminal, or a speed of said terminal, or an uplink signal to noise ratio of said terminal, an uplink channel estimate of said terminal, or a power delay profile of said terminal, or a downlink reference signal received power of said terminal, or a downlink reference signal received power difference of said terminal for cell candidates.

According to further example embodiments, said terminal mobility profile is indicative of a terminal speed.

According to a variation of the procedure shown in FIG. 3, exemplary additional operations are given, which are inherently independent from each other as such. According to such variation, an exemplary method according to example embodiments may comprise an operation of training said trained neural network based on a plurality of training cell configurations related to mobility and throughput balance and a plurality of training terminal mobility profiles as input.

According to a variation of the procedure shown in FIG. 3, exemplary details of the training operation are given, which are inherently independent from each other as such. Such exemplary training operation according to example embodiments may comprise an operation of learning a throughput optimization degree for each combination pair of said plurality of training cell configurations and said plurality of training terminal mobility profiles.

According to further example embodiments, said trained neural network is trained such that for a terminal mobility profile indicative of a higher terminal speed a cell configuration with a higher number of reserved reference signal cell resources for channel estimation leads to a higher throughput optimization degree than a cell configuration with a lower number of reserved reference signal cell resources for channel estimation, and such that for a terminal mobility profile indicative of a lower terminal speed a cell configuration with a lower number of reserved reference signal cell resources for channel estimation leads to a higher throughput optimization degree than a cell configuration with a higher number of reserved reference signal cell resources for channel estimation.

Example embodiments outlined and specified above are explained below in more specific terms.

According to example embodiments, the input of a neural network is as follows:

Based on an UL estimate of a UE speed profile, the neural network in a base station could predict the optimized cell speed profile to maximize the cell performance.

The UE speed profile categorizes the speed (low or high) of the moving UE served by a cell in the access node/base station.

The cell speed profile represents a cell configuration using appropriate settings: the spectrum central frequency (Fc) and the number of reserved cell resources (pilot tones) for UE speed tracking. The neural network helps to determine if a higher number of reserved resources (pilot tones) for frequency offset estimation for high-speed user profile, or if higher number of resources allocated to data for low-speed user profile, has the highest probability to maximize the cell data rate.

The neural network is trained to learn that for a low-speed UE profile, the frequency offset estimation does not require higher frequency offset estimate resources reservation: the optimal output probability is achieved with low-speed cell profile, that is with lower frequency reference resources (pilot tones) consumption, as data decoding is mainly impacted by coding rate and number of resources allocated to user data transmission.

The neural network is further trained to learn that for a high-speed UE profile, the frequency offset estimation requires higher frequency offset estimation resources reservation: the optimal output probability is achieved with high-speed cell profile, that is with higher reference resources allocation, as data decoding is mainly impacted by correct frequency estimation and error correction to minimize ICI (from adjacent carrier leakage).

The input to the neural-network learning phase are the UE speed profile and the cell speed profile vectors.

The UE speed profile variates with the UE mobility in the cell. The UE speed profile vector is given by different variables: UL frequency offset (Hz) or UE speed (km/h) estimated by access node receiver of the cell; UL signal to noise ratio (SNR), UL channel estimate and power delay profile (PDP); DL reference signal received power (RSRP) measured and reported by UE; DL RSRP delta between the two best cell candidates belonging to different cell speed profiles.

For higher frequency offset, channel estimate and PDP profile high variations characterize a high-speed UE with higher probability at higher SNR.

For lower frequency offset, channel estimate and PDP profile low variations characterize a low-speed UE with higher probability at higher SNR. DL RSRP delta is feature input additionally considered to reinforce the probability of a handover decision.

The cell speed profile is the same for all UEs camped in the cell. The cell speed profile vector is given by at least two variables, common for all UEs in the cell: the spectrum central frequency (Fc, Hz); the number of reserved resources (pilot tones) for frequency offset estimation.

As an example, the low-speed cell profile vector is given by Fc1 and x1 pilot tones (e.g. optimizing cell throughput for low-speed UEs), and the high-speed cell profile vector is given by Fc2 and x2 (x2>x1) pilot tones (e.g. optimizing cell throughput for high-speed UEs).

According to example embodiments, the neural network training is as follows:

For the neural network assigned training, the neural network stores from the base station the performance simulations for a specific UL speed, UL frequency offset estimate at a given Doppler input for a given cell speed profile, DL RSRP measured and reported by UE; DL RSRP delta between two best cell candidates belonging to different cell speed profile layouts.

The training may be carried out by collecting the receiver performance simulation data into a data storage or by collecting the inputs from the access network that have been injected in receiver simulation to provide the training performance data, that maximize the optimum throughput data rate performance.

According to example embodiments, the neural network inference is as follows:

The inference may be performed for an exhaustive set of UE and cell speed profile vectors. For example, assuming a certain UE speed profile vector, the neural network predicts the profile of low or high-speed cell configuration that maximize the cell data rate.

For example, for a given UE speed profile based on UL frequency offset estimation and the UL SNR allowing to characterize the frequency offset estimation precision (e.g. the higher the SNR the higher the estimate accuracy), the neural network in the base station could predict the optimal probability for the UE and cell speed profiles combination that maximize the cell data rate.

Each UE speed and cell speed profile vectors pair is taken as an input for the training phase of neural network, which is configured to produce an optimized cell speed profile.

The cell speed profile vector is a vector of variables determining the cell speed profile, for example: Fc spectrum central frequency, x number of pilot tones reserved to frequency offset estimation.

The cell speed profile is the cell speed classification result value, i.e. low-speed or high-speed profile.

The cell throughput is optimized accordingly to the handover decision that is the outcome of UE and cell speed profile classification: when input speed profile vector of a cell is characterized as belonging to a specific speed class (low or high-speed cell profile) and input speed profile vector of UE is characterized as belonging to a specific speed class (low or high-speed UE), a (potential) handover is accordingly evaluated, if needed.

For example, for input vector of a cell profile classified as low-speed cell (Fc1, x1 pilot tones) and for input vector of a UE profile classified as high-speed UE, a handover is proposed to redirect the UE to the access node cell with high-speed profile (Fc2, x2 pilot tones with x2>x1).

As a result, the throughput of a cell classified as low-speed cell in the access node is maximized by serving UEs with low-speed mobility. On the other hand, the throughput of a cell classified as high-speed cell in access node is maximized by serving UEs with high-speed mobility.

Each UE speed and cell speed vector profiles pair input may be encoded into a numerical class indicator to allow the neural network outputting probabilities for the optimality of the cell speed profile.

Indeed, the classification score can be seen as a set of probabilities, where each probability is the probability of the input data, including the feature from a set of features, in the present case the features in UE speed and cell speed profile vector combination: the one with the highest probability to maximize the throughput is chosen as the classification result.

In the process, the neural network learns to recognize correlations between the features and optimal results.

The reference performance metric to optimize the output is the highest throughput data. The produced cell speed profile gives the highest probability of highest cell data rate.

Once the cell speed profile that optimizes the throughput is predicted, it could be used to determine if handover to a different frequency speed layout is needed.

In the training phase, the neural network learnt to recognize correlations between optimal results prediction and relevant features: Cell speed profile vector (Fc, Hz, spectrum central frequency; number of reserved pilot tones); UE speed profile vector (UL SNR; UL channel estimate and PDP, UL frequency offset or UE speed; DL RSRP). Additionally, DL RSRP delta between the two best candidates belonging to different cell speed profile layouts is considered to minimize the potential performance degradation in target cell due to weaker DL signal strength, reducing the risk of insecure frequency layout changes.

When a new measurement is provided to the neural network, in response, the neural network makes prediction for best cell and UE speed profile. The neural network predicts for the given UE speed and cell speed vector profiles pair input the profile probabilities for all speed profiles providing as response the best to be proposed as classified to reach max cell throughput target.

Once predicted, if cell speed probability is below a pre-set probability target threshold, no other actions are propagated to access network. The rational is to minimize the risk of useless signaling from base station to UE for unnecessary handover procedures.

If, on the other hand, the output probability is above the target threshold, this will trigger the proposal to access network to initiate handover signaling from radio base station to UE, allowing to handle frequency estimate with optimized resource allocation.

According to example embodiments, the neural network may be specifically implemented as follows (example of possible neural network structure, example embodiments are not limited thereto):

The exemplarily implemented neural network includes four layers in total:

First layer: input, two hidden layers, one output layer, and two inputs (UE speed profile and the cell speed profile vectors).

UE speed profile vector: UL SNR, UL channel estimate and PDP, UL frequency offset or speed; DL RSRP reported by UE; DL RSRP delta.

Cell speed profile vector: spectrum central frequency (Fc, Hz); number of reserved resources (pilot tones) for frequency offset estimation.

For example, the low-speed cell profile vector could be given by Fc1 and x1 pilot tones; the high-speed cell profile vector could be given by Fc2 and x2 pilot tones (x2>x1).

| LAYER | Input to Layers | Output | Activation function |
| --- | --- | --- | --- |
| 1. Input | 2 | 50 | ReLu(z) |
| 2. hidden | 50 | 50 | ReLu(z) |
| 3. hidden | 50 | 50 | ReLu(z) |
| 4. Output | 50 | 1 | Sigmoid |

For the hidden layers, the ReLU as activation function is applied. For the output layer, a sigmoid function to map the output to class probabilities is applied. There are two input features, which are mapped into a prediction among a given number of classes, each class representing a certain combination of two inputs.

The optimal cell speed profile represents a label, i.e., the output of the neural network.

It is noted that each speed vector may be encoded into a numerical class indicator, and therefore, the neural network may essentially output probabilities for the optimality of a cell Speed profile. The one with the highest probability is typically chosen as the classification result.

According to example embodiments, feedback from real networks observation could allow to fine-tune the output of the neural network, thereby improving the prediction precision or any new change on the real network.

In consequence of the above, applying neural network-based UL speed profile learning to wireless communications in radio access networks according to the principles specified herein by means of example embodiments advantageously allows to identify dynamically the optimized resources configuration for all kinds of served user speed profiles.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network node or entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 17:
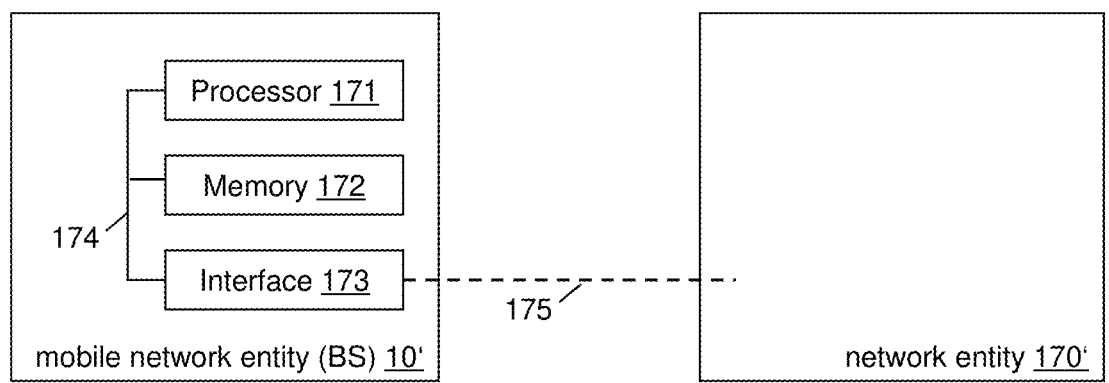
FIG. 17 is a block diagram alternatively illustrating an apparatus according to example embodiments.

In FIG. 17, an alternative illustration of apparatuses according to example embodiments is depicted. As indicated in FIG. 17, according to example embodiments, the apparatus (mobile network node or entity) 10' (corresponding to the mobile network node or entity 10) comprises a processor 171, a memory 172 and an interface 173, which are connected by a bus 174 or the like. The apparatus 10' may be connected with another network node or entity 170' (e.g. an interface thereof) via link 175.

The processor 171 and/or the interface 173 may also include a modem or the like to facilitate communication over a (hardwire or wireless) link, respectively. The interface 173 may include a suitable transceiver coupled to one or more antennas or communication means for (hardwire or wireless) communications with the linked or connected device(s), respectively. The interface 173 is generally configured to communicate with at least one other apparatus, i.e. the interface thereof.

The memory 172 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the mobile network node or entity 10 (of a first network cell providing network access to a terminal) comprises at least one processor 171, at least one memory 172 including computer program code, and at least one interface 173 configured for communication with at least another apparatus. The processor (i.e. the at least one processor 171, with the at least one memory 172 and the computer program code) is configured to perform obtaining information indicative of a terminal mobility profile of said terminal (thus the apparatus comprising corresponding means for obtaining), to perform predicting, utilizing a trained neural network, for each cell configuration of a plurality of cell configurations related to mobility and throughput balance, a throughput optimization degree for said terminal mobility profile (thus the apparatus comprising corresponding means for predicting), to perform selecting, from said plurality of cell configurations, a cell configuration having a highest throughput optimization degree (thus the apparatus comprising corresponding means for selecting), and to perform deciding, based on said highest throughput optimization degree whether to trigger a handover of said terminal from said first network cell to a second network cell (thus the apparatus comprising corresponding means for deciding).

For further details regarding the operability/functionality of the individual apparatuses, reference is made to the above description in connection with any one of FIGS. 1 to 16, respectively.

For the purpose of the present disclosure as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for mobile terminal handover decision optimizations. Such measures exemplarily comprise, e.g. at a network entity of a first network cell providing network access to a terminal, obtaining information indicative of a terminal mobility profile of said terminal, predicting, utilizing a trained neural network, for each cell configuration of a plurality of cell configurations related to mobility and throughput balance, a throughput optimization degree for said terminal mobility profile, selecting, from said plurality of cell configurations, a cell configuration having a highest throughput optimization degree, and deciding, based on said highest throughput optimization degree whether to trigger a handover of said terminal from said first network cell to a second network cell.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

Among others, the following Items are covered by what is disclosed herein:

Item 1. An apparatus of a network entity of a first network cell providing network access to a terminal, the apparatus comprising obtaining circuitry configured to obtain information indicative of a terminal mobility profile of said terminal, predicting circuitry configured to predict, utilizing a trained neural network, for each cell configuration of a plurality of cell configurations related to mobility and throughput balance, a throughput optimization degree for said terminal mobility profile, selecting circuitry configured to select, from said plurality of cell configurations, a cell configuration having a highest throughput optimization degree, and deciding circuitry configured to decide, based on said highest throughput optimization degree whether to trigger a handover of said terminal from said first network cell to a second network cell.

Item 2. The apparatus according to Item 1, further comprising comparing circuitry configured to compare said highest throughput optimization degree with a trigger decision threshold, and deciding circuitry configured to decide to trigger said handover of said terminal from said first network cell to said second network cell, if said highest throughput optimization degree exceeds said trigger decision threshold.

Item 3. The apparatus according to Item 1 or 2, further comprising estimating circuitry configured to estimate said terminal mobility profile of said terminal based on said information indicative of said terminal mobility profile of said terminal.

Item 4. The apparatus according to any of Items 1 to 3, wherein said second cell has a cell configuration corresponding to said cell configuration having said highest throughput optimization degree.

Item 5. The apparatus according to any of Items 1 to 4, further comprising selecting circuitry configured to select said second cell out of a plurality of candidate cells based on said cell configuration having said highest throughput optimization degree and respective cell configurations of said plurality of candidate cells.

Item 6. The apparatus according to any of Items 1 to 5, wherein each of said plurality of cell configurations includes at least one of:
a spectrum central frequency, or
a number of reserved reference signal cell resources for channel estimation.

Item 7. The apparatus according to any of Items 1 to 6, wherein said information indicative of said terminal mobility profile of said terminal includes at least one of:
an uplink frequency offset of said terminal, or
a speed of said terminal, or
an uplink signal to noise ratio of said terminal, an uplink channel estimate of said terminal, or
a power delay profile of said terminal, or
a downlink reference signal received power of said terminal, or
a downlink reference signal received power difference of said terminal for cell candidates.

Item 8. The apparatus according to any of Items 1 to 7, wherein
said terminal mobility profile is indicative of a terminal speed.

Item 9. The apparatus according to any of Items 1 to 8, further comprising
training circuitry configured to train said trained neural network based on a plurality of training cell configurations related to mobility and throughput balance and a plurality of training terminal mobility profiles as input.

Item 10. The apparatus according to Item 9, further comprising
learning circuitry configured to learn a throughput optimization degree for each combination pair of said plurality of training cell configurations and said plurality of training terminal mobility profiles.

Item 11. The apparatus according to any of Items 1 to 10, wherein
said trained neural network is trained
such that for a terminal mobility profile indicative of a higher terminal speed a cell configuration with a higher number of reserved reference signal cell resources for channel estimation leads to a higher throughput optimization degree than a cell configuration with a lower number of reserved reference signal cell resources for channel estimation, and
such that for a terminal mobility profile indicative of a lower terminal speed a cell configuration with a lower number of reserved reference signal cell resources for channel estimation leads to a higher throughput optimization degree than a cell configuration with a higher number of reserved reference signal cell resources for channel estimation.

Item 12. An apparatus of a network entity of a first network cell providing network access to a terminal, the apparatus comprising
at least one processor, and
at least one memory storing instructions that, when executed by the at least one processor, cause the apparatus at least to perform:
obtaining information indicative of a terminal mobility profile of said terminal,
predicting, utilizing a trained neural network, for each cell configuration of a plurality of cell configurations related to mobility and throughput balance, a throughput optimization degree for said terminal mobility profile,
selecting, from said plurality of cell configurations, a cell configuration having a highest throughput optimization degree, and
deciding, based on said highest throughput optimization degree whether to trigger a handover of said terminal from said first network cell to a second network cell.

Item 13. The apparatus according to Item 12, wherein
in relation to said deciding, the instructions, when executed by the at least one processor, cause the apparatus at least to perform:
comparing said highest throughput optimization degree with a trigger decision threshold, and
deciding to trigger said handover of said terminal from said first network cell to said second network cell, if said highest throughput optimization degree exceeds said trigger decision threshold.

Item 14. The apparatus according to Item 12 or 13, wherein
the instructions, when executed by the at least one processor, cause the apparatus at least to perform:
estimating said terminal mobility profile of said terminal based on said information indicative of said terminal mobility profile of said terminal.

Item 15. The apparatus according to any of Items 12 to 14, wherein
said second cell has a cell configuration corresponding to said cell configuration having said highest throughput optimization degree.

Item 16. The apparatus according to any of Items 12 to 15, wherein
the instructions, when executed by the at least one processor, cause the apparatus at least to perform:
selecting said second cell out of a plurality of candidate cells based on said cell configuration having said highest throughput optimization degree and respective cell configurations of said plurality of candidate cells.

Item 17. The apparatus according to any of Items 12 to 16, wherein
each of said plurality of cell configurations includes at least one of:
a spectrum central frequency, or
a number of reserved reference signal cell resources for channel estimation.

Item 18. The apparatus according to any of Items 12 to 17, wherein
said information indicative of said terminal mobility profile of said terminal includes at least one of:
an uplink frequency offset of said terminal, or
a speed of said terminal, or
an uplink signal to noise ratio of said terminal,
an uplink channel estimate of said terminal, or
a power delay profile of said terminal, or
a downlink reference signal received power of said terminal, or
a downlink reference signal received power difference of said terminal for cell candidates.

Item 19. The apparatus according to any of Items 12 to 18, wherein
said terminal mobility profile is indicative of a terminal speed.

Item 20. The apparatus according to any of Items 12 to 19, wherein
the instructions, when executed by the at least one processor, cause the apparatus at least to perform:
training said trained neural network based on a plurality of training cell configurations related to mobility and throughput balance and a plurality of training terminal mobility profiles as input.

Item 21. The apparatus according to Item 20, wherein
in relation to said training, the instructions, when executed by the at least one processor, cause the apparatus at least to perform:
learning a throughput optimization degree for each combination pair of said plurality of training cell configurations and said plurality of training terminal mobility profiles.

Item 22. The apparatus according to any of Items 12 to 21, wherein
said trained neural network is trained
such that for a terminal mobility profile indicative of a higher terminal speed a cell configuration with a higher number of reserved reference signal cell resources for channel estimation leads to a higher throughput optimization degree than a cell configuration with a lower number of reserved reference signal cell resources for channel estimation, and
such that for a terminal mobility profile indicative of a lower terminal speed a cell configuration with a lower number of reserved reference signal cell resources for channel estimation leads to a higher throughput optimization degree than a cell configuration with a higher number of reserved reference signal cell resources for channel estimation.

LIST OF ACRONYMS AND ABBREVIATIONS

3GPP Third Generation Partnership Project
AN access network
BER bit error rate
BS base station
CDMA code division multiple access
CFO carrier frequency offset
DL downlink
FDMA frequency-division multiple access
FO frequency offset
ICI inter-carrier-interference
LTE long term evolution
MLE maximum likelihood
MSE mean squared error
OFDMA orthogonal frequency-division multiple access
PDP power delay profile
ReLU rectified linear unit
RSRP reference signal received power
SC-FDMA single-carrier frequency-division multiple access
SNR signal to noise ratio
TDMA time division multiple access
TD-SCDMA time division synchronous code division multiple access
UE user equipment
UL uplink
UMTS universal mobile telecommunications system

The invention claimed is:

1. A method of a network entity of a first network cell providing network access to a terminal, the method comprising:
obtaining information indicative of a terminal mobility profile of said terminal,
predicting, utilizing a trained neural network, for each cell configuration of a plurality of cell configurations related to mobility and throughput balance,
a predicted throughput optimization degree of the cell configuration for said terminal mobility profile,
the predicting resulting to a plurality of predicted throughput optimization degrees for said terminal mobility profile,
wherein each of said plurality of cell configurations includes at least a number of reserved reference signal cell resources for channel estimation,
selecting, from said plurality of cell configurations, based on corresponding predicted throughput optimization degrees, a cell configuration having a highest predicted throughput optimization degree for the terminal mobility profile, when a particular number of the reserved reference signal cell resources are used for the channel estimation, and
deciding, based on said highest predicted throughput optimization degree of the cell configuration selected for the terminal mobility profile, whether to trigger a handover of said terminal from said first network cell to a second network cell.

2. The method according to claim 1, wherein in relation to said deciding, the method further comprises
comparing said highest predicted throughput optimization degree with a trigger decision threshold, and
deciding to trigger said handover of said terminal from said first network cell to said second network cell, if said highest predicted throughput optimization degree exceeds said trigger decision threshold.

3. The method according to claim 1, further comprising
estimating said terminal mobility profile of said terminal based on said information indicative of said terminal mobility profile of said terminal.

4. The method according to claim 1, wherein
said second cell has a cell configuration corresponding to said cell configuration having said highest predicted throughput optimization degree.

5. The method according to claim 1, further comprising
selecting said second cell out of a plurality of candidate cells based on said cell configuration having said highest predicted throughput optimization degree and respective cell configurations of said plurality of candidate cells.

6. The method according to claim 1, wherein
each of said plurality of cell configurations further includes:
a spectrum central frequency.

7. The method according to claim 1, wherein
said information indicative of said terminal mobility profile of said terminal includes at least one of:
an uplink frequency offset of said terminal, or
a speed of said terminal, or
an uplink signal to noise ratio of said terminal,
an uplink channel estimate of said terminal, or
a power delay profile of said terminal, or
a downlink reference signal received power of said terminal, or
a downlink reference signal received power difference of said terminal for cell candidates.

8. The method according to claim 1, wherein
said terminal mobility profile is indicative of a terminal speed.

9. The method according to claim 1, further comprising
training said trained neural network based on a plurality of training cell configurations related to mobility and throughput balance and a plurality of training terminal mobility profiles as input.

10. The method according to claim 9, wherein
in relation to said training, the method further comprises
learning a predicted throughput optimization degree for each combination pair of said plurality of training cell configurations and said plurality of training terminal mobility profiles.

11. The method according to claim 1, wherein
said trained neural network is trained
such that for a terminal mobility profile indicative of a higher terminal speed a cell configuration with a higher number of reserved reference signal cell resources for channel estimation leads to a higher predicted throughput optimization degree than a cell configuration with a lower number of reserved reference signal cell resources for channel estimation, and such that for a terminal mobility profile indicative of a lower terminal speed a cell configuration with a lower number of reserved reference signal cell resources for channel estimation leads to a higher predicted throughput optimization degree than a cell configuration with a higher number of reserved reference signal cell resources for channel estimation.

12. A computer program product comprising computer-executable computer program code which, when the program is run on a computer, is configured to cause the computer to carry out the method according to claim 1, wherein optionally the computer program product comprises a non-transitory computer-readable medium on which the computer-executable computer program code is stored, and/or wherein the program is directly loadable into an internal memory of the computer or a processor thereof.

13. An apparatus of a network entity of a first network cell providing network access to a terminal, the apparatus comprising at least one processor, and at least one memory storing instructions that, when executed by the at least one processor, cause the apparatus at least to perform:

obtaining information indicative of a terminal mobility profile of said terminal, predicting, utilizing a trained neural network, for each cell configuration of a plurality of cell configurations related to mobility and throughput balance, a predicted throughput optimization degree of the cell configuration for said terminal mobility profile, the predicting resulting to a plurality of predicted throughput optimization degrees for said terminal mobility profile, wherein each of said plurality of cell configurations includes at least a number of reserved reference signal cell resources for channel estimation, selecting, from said plurality of cell configurations, based on corresponding predicted throughput optimization degrees, a cell configuration having a highest predicted throughput optimization degree for the terminal mobility profile, when a particular number of the reserved reference signal cell resources are used for the channel estimation, and deciding, based on said highest predicted throughput optimization degree of the cell configuration selected for the terminal mobility profile, whether to trigger a handover of said terminal from said first network cell to a second network cell.

14. The apparatus according to claim 13, wherein in relation to said deciding, the instructions, when executed by the at least one processor, cause the apparatus at least to perform:

comparing said highest predicted throughput optimization degree with a trigger decision threshold, and deciding to trigger said handover of said terminal from said first network cell to said second network cell, if said highest predicted throughput optimization degree exceeds said trigger decision threshold.

15. The apparatus according to claim 13, wherein the instructions, when executed by the at least one processor, cause the apparatus at least to perform:

estimating said terminal mobility profile of said terminal based on said information indicative of said terminal mobility profile of said terminal.

16. The apparatus according to claim 13, wherein said second cell has a cell configuration corresponding to said cell configuration having said highest predicted throughput optimization degree.

17. The apparatus according to claim 13, wherein the instructions, when executed by the at least one processor, cause the apparatus at least to perform:

selecting said second cell out of a plurality of candidate cells based on said cell configuration having said highest predicted throughput optimization degree and respective cell configurations of said plurality of candidate cells.

18. The apparatus according to claim 13, wherein the instructions, when executed by the at least one processor, cause the apparatus at least to perform:

training said trained neural network based on a plurality of training cell configurations related to mobility and throughput balance and a plurality of training terminal mobility profiles as input.

19. The apparatus according to claim 18, wherein in relation to said training, the instructions, when executed by the at least one processor, cause the apparatus at least to perform:

learning a predicted throughput optimization degree for each combination pair of said plurality of training cell configurations and said plurality of training terminal mobility profiles.

20. The apparatus according to claim 13, wherein said trained neural network is trained such that for a terminal mobility profile indicative of a higher terminal speed a cell configuration with a higher number of reserved reference signal cell resources for channel estimation leads to a higher predicted throughput optimization degree than a cell configuration with a lower number of reserved reference signal cell resources for channel estimation, and such that for a terminal mobility profile indicative of a lower terminal speed a cell configuration with a lower number of reserved reference signal cell resources for channel estimation leads to a higher predicted throughput optimization degree than a cell configuration with a higher number of reserved reference signal cell resources for channel estimation.

* * * * *